(12) United States Patent
Chen et al.

(10) Patent No.: US 11,859,596 B2
(45) Date of Patent: Jan. 2, 2024

(54) ELECTRIC HEATING THERMAL MANAGEMENT SYSTEM FOR OIL AND GAS TRANSPORTATION PIPELINE BASED ON RENEWABLE ENERGY AND CO2 ENERGY STORAGE

(71) Applicant: DALIAN UNIVERSITY OF TECHNOLOGY, Dalian (CN)

(72) Inventors: Cong Chen, Dalian (CN); Yongchen Song, Dalian (CN); Xi Wang, Dalian (CN); Zherui Chen, Dalian (CN); Jingyue Sun, Dalian (CN); Yu Liu, Dalian (CN); Yi Zhang, Dalian (CN); Mingjun Yang, Dalian (CN); Jiafei Zhao, Dalian (CN); Weiguo Liu, Dalian (CN); Yan Qin, Dalian (CN); Zheng Ling, Dalian (CN); Lanlan Jiang, Dalian (CN); Lunxiang Zhang, Dalian (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 53 days.

(21) Appl. No.: 17/979,227

(22) Filed: Nov. 2, 2022

(65) Prior Publication Data

US 2023/0228245 A1 Jul. 20, 2023

(30) Foreign Application Priority Data

Jan. 17, 2022 (CN) .......................... 202210045858.4

(51) Int. Cl.
*F03D 9/25* (2016.01)
*F16L 59/02* (2006.01)
(Continued)

(52) U.S. Cl.
CPC .................. *F03D 9/25* (2016.05); *F01K 3/00* (2013.01); *F01K 3/186* (2013.01); *F16L 59/02* (2013.01); *H05B 1/00* (2013.01)

(58) Field of Classification Search
CPC .... F03D 9/25; F01K 3/00; F01K 3/186; F16L 59/02; H05B 1/00
See application file for complete search history.

(56) References Cited

U.S. PATENT DOCUMENTS 6,292,627 B1 9/2001 Gilchrist, Jr. et al.
6,371,693 B1 4/2002 Kopp et al.
(Continued)

FOREIGN PATENT DOCUMENTS

AU 2020200099 B2 * 9/2021 ............... C25B 1/04
CN 2895982 Y 5/2007
(Continued)

*Primary Examiner* — Shawntina T Fuqua
(74) *Attorney, Agent, or Firm* — Muncy, Geissler, Olds & Lowe, P.C.

(57) ABSTRACT

The present invention discloses an electric heating thermal management system for an oil and gas transportation pipeline based on renewable energy and $CO_2$ energy storage. It transmits the feedback data value through a data collection device arranged in the pipeline to the early warning device by the control device. After analysis and processing, the early warning device can feed back the data value to the control device and the remote operation device in two modes. Different degrees of heating amount can be generated for the oil and gas transportation pipelines at different positions in different modes. Hierarchical and distributed management control for the oil and gas transportation pipelines can be targetedly conducted in unblocked, easily blocked and blocked positions of the oil and gas transportation pipeline. The present invention couples the renewable energy electricity supply device and the $CO_2$ energy storage device.

10 Claims, 2 Drawing Sheets

(51) Int. Cl.
*F01K 3/00* (2006.01)
*F01K 3/18* (2006.01)
*H05B 1/00* (2006.01)

(56) References Cited

U.S. PATENT DOCUMENTS

2013/0038055 A1* 2/2013 Ostrom ................ H02K 7/1823
290/2
2015/0143806 A1* 5/2015 Friesth .................... F01K 13/02
220/592.2

FOREIGN PATENT DOCUMENTS

| CN | 204962146 U | 1/2016 |
| CN | 207864879 U | 9/2018 |
| CN | 108980504 A | 12/2018 |
| CN | 110966477 A | 4/2020 |
| WO | WO-2020188363 A1 | 9/2020 |

\* cited by examiner

ELECTRIC HEATING THERMAL MANAGEMENT SYSTEM FOR OIL AND GAS TRANSPORTATION PIPELINE BASED ON RENEWABLE ENERGY AND CO2 ENERGY STORAGE

TECHNICAL FIELD

The present invention belongs to the technical field of flowing safety assurance of oil and gas transportation pipelines, and particularly relates to an electric heating thermal management system for an oil and gas transportation pipeline based on renewable energy and $CO_2$ energy storage.

BACKGROUND

At present, deep sea oil and gas represent a major trend of oil development in the world. Pipes for transporting oil and gas are generally steel pipes, and a long distance pipeline is welded by connecting devices such as flanges and tees; and equipment such as valves is used for opening and closing control and flow regulation. However, at present, in the long-distance transportation process of deep sea pipelines, due to high pressure and low temperature, solid matters represented by wax crystals and hydrates are easy to form inside the pipelines, especially at the bent pipe section of the pipelines and connecting valves. With the continuous dissipation of heat in the transportation pipeline, the temperature further drops, which leads to the blockage of the pipeline by the solid matters, and even the rupture of the oil and gas transportation pipeline, resulting in oil and gas leakage and bringing huge economic loss.

CCUS (Carbon Capture, Utilization and Storage) technology is one of the important means to achieve carbon neutrality and peak carbon dioxide emissions. The captured $CO_2$ is transported through the pipeline in a supercritical state and injected into a seabed storage body. However, in a deep-sea environment, the decrease of the temperature in a $CO_2$ gas transportation pipeline will lead to the change of $CO_2$ gas state, which will affect the transportation, storage amount and storage efficiency of $CO_2$ in the storage body. When there is moisture in the $CO_2$ gas transportation pipeline, due to high pressure and low temperature conditions, it is extremely easy to generate solid matters such as hydrates in the pipeline, which will lead to blockage, rupture and leakage of $CO_2$ gas in serious cases.

To prevent the solid matters in the oil and gas transportation pipeline from blocking the pipeline, a heating method and an inhibitor injection method are often used to overcome this problem in the implementation of practical projects. However, as the oil and gas industry continues to transfer to the deep sea, people are increasingly unable to bear the drawbacks of large use amount of injected inhibitors, high price and damage to the ecological environment, so prevention of blockage by the solid matters in the form of heating is increasingly favored. To prevent the occurrence of supercritical state failure in the process of gaseous $CO_2$ transportation, the heating method is the most feasible method to realize thermal management of the pipeline.

For deep-sea oil and gas transportation pipelines, there are many difficulties in supplementing electricity for heating devices at a distance, and the consumption of the electricity required is also huge capital cost. At present, the potential energy of the ocean itself has not been used to provide energy for the heating device of the transportation pipeline in China and abroad. In addition, the intermittency of energy supply of renewable energy and low energy utilization efficiency are also the biggest limitations at present.

At present, it is commonly used to heat the pipeline by winding the transportation pipeline with electric tracing bands, so that oil and gas temperature in the oil and gas transportation pipeline is always kept above the critical temperature for formation of the solid matters. The whole process only adopts a spiral winding mode, which greatly increases the resistance of the electric tracing bands, and a large amount of electric energy is wasted in long-term use, thereby increasing the production cost. In addition, no effective thermal insulation structure is arranged at the bottom of the deep sea. The heat generated by heating is extremely easy to escape into the deep sea, which makes the heating effect not obvious enough. In extreme conditions, the heating effect will even be lost, which will not play the role of heating, but lead to the waste of resources. In addition, the existing electric tracing bands are always laid on the transportation pipeline, and a heating control device is not perfect enough to heat the transportation pipeline to different degrees in the unblocked, easily blocked or blocked positions, thereby wasting the electric energy and also reducing the application scope of the electric tracing bands.

SUMMARY

In view of the above problems in the prior art, the present invention provides an electric heating thermal management system for an oil and gas transportation pipeline based on renewable energy and $CO_2$ energy storage. A renewable energy electricity supply device is coupled with a $CO_2$ energy storage device, and power is provided for an electric heating device of an oil and gas transportation pipeline; and the existing arrangement mode of the heating device is improved, to realize hierarchical and distributed control on the electric heating device of the oil and gas transportation pipeline, so as to reduce the risk of pipeline blockage by solid matters in the process of oil and gas transportation, and pave a way for the commercial exploitation and transportation of hydrate resources.

To achieve the above purpose, the present invention adopts the following technical solution:

An electric heating thermal management system for an oil and gas transportation pipeline based on renewable energy and $CO_2$ energy storage comprises:

a renewable energy electricity supply device used for low-cost electric energy supply;

a $CO_2$ energy storage device connected with the renewable energy electricity supply device and used for storing electric energy, steadily and continuously outputting electricity and providing replacement gas for efficient exploitation of reservoir oil and gas;

a control device connected with the $CO_2$ energy storage device and used for providing electric energy for an electric heating device of the oil and gas transportation pipeline using the electric energy provided by the $CO_2$ energy storage device, and controlling electric tracing bands to produce different thermal responses;

an early warning device connected with the control device and a remote operation device respectively and used for analyzing and processing signals transmitted by the control device and making a response in time;

the remote operation device connected with the early warning device and the control device respectively and used for commanding the control device for controlling an operation state of the electric heating device of the oil and gas transportation pipeline;

the electric heating device of the oil and gas transportation pipeline, which is connected with the control device and used for preventing and controlling solid matters in the oil and gas transportation pipeline to ensure the safe and effective operation of the transportation pipeline.

Further, the control device is provided with a plurality of groups of junction boxes; a plurality of groups of wires are arranged in the junction boxes; and the plurality of groups of wires are wrapped by insulators.

Further, the electric heating device of the oil and gas transportation pipeline is provided with an inner steel pipe body, an insulating anticorrosive layer, the electric tracing bands, a sandwich layer, an outer steel pipe protecting body and a pipe clamp from inside to outside.

Further, the early warning device has an intelligent mode and an artificial mode; the intelligent mode: when data values fed back by a temperature sensor and a pressure sensor reach a preset temperature threshold and a preset pressure threshold, an intelligent command control device energizes the electric tracing bands and produces different degrees of thermal responses. The artificial mode: the early warning device transmits a signal to the remote operation device; and a field operator instructs the control device to set different parameters to energize the electric tracing bands at different positions, strictly controls the heating temperature, and can combine with an inhibitor to jointly act when necessary to ensure the safe and effective operation of the transportation pipeline.

Further, thermal insulation material is filled in the sandwich layer; and the thermal insulation material comprises, but not limited to, epoxy resin and composite polypropylene to reduce heat dissipation time and heat dissipation amount of the oil and gas transportation pipeline.

Further, the electric tracing bands are axially laid in a distributed way in a straight pipe section along the outer side of the inner steel pipe body, and are arranged in an S shape at an elbow section of the pipeline, a three-way valve or a similar structure.

Further, when the electric tracing bands are laid on the outer side of the inner steel pipe body in a form of one for use and one for backup or more than two, the electric tracing bands are uniformly arranged on the axial center of the inner steel pipe body.

Further, the electric tracing bands are fixed on the outer wall of the inner steel pipe body through stainless steel cable ties or metal soft wires arranged at intervals and flanges with reserved through holes.

Further, the electric heating device of the oil and gas transportation pipeline is provided with a pipe clamp for fixing the pipeline in a distributed way; the pipe clamp comprises two semicircular upper pipe clamp and lower pipe clamp; and the upper pipe clamp and the lower pipe clamp are connected through a plurality of bolts and nuts.

Further, through holes are reserved on the sandwich layer and the outer steel pipe protecting body as required; a through groove perpendicular to the inner steel pipe body is arranged on the upper part of the pipe clamp as required; and a plurality of groups of wires arranged below the control device are connected with electric tracing band joints through the through groove, which will realize the distributed management of the oil and gas transportation pipeline.

Further, the top of the three-way valve is provided with a protecting pipe which vertically extends to the top end of the inner steel pipe body; the temperature sensor and the pressure sensor are embedded in the protecting pipe in advance in an actual construction process; the wires are led out through the through groove; and the connection is sealed by a sealing technology.

The present invention can obtain the following technical effects because the above technical solution is adopted:

1. The present invention couples the renewable energy electricity supply device and the $CO_2$ energy storage device, avoids the fluctuation and intermittency of the renewable energy electricity supply device, can provide electric energy for the electric heating device of the oil and gas transportation pipeline smoothly and continuously, also provides replacement gas for the efficient exploitation of reservoir oil and gas, and reduces huge economic cost.
2. The electric tracing bands are arranged as heating elements; and in combination with the arrangement modes of direct laying along the axial direction of the pipeline at a straight pipe section and S-shaped arrangement at the elbow section or valve connection, the influence of poor heating effect caused by large resistance difference in different positions of the heating elements is reduced.
3. The temperature sensor and the pressure sensor extend through the top of the three-way valve to the inner top end of the inner steel pipe body, and fully contact with the oil and gas inside the pipeline, and the feedback data is more accurate.
4. The thermal insulation structure of a pipe sleeve pipe sandwichcan satisfy the requirements of pressure resistance and thermal insulation of submarine pipelines.
5. In the present invention, the electric tracing bands are arranged on the sandwich layer, without damaging the original structure of the oil and gas transportation pipeline; and compared with the unblocking mode of heating with a heating layer arranged on the inner wall of the pipeline, the limitation of material development on the heating elements at the inner wall of the pipeline is avoided.
6. The early warning device adjusts the intelligent mode and the artificial mode of the system according to real-time data feedback values, and improves the safety of oil and gas transportation.
7. Relying on the special structure of arranging the through groove below the pipe clamp used for fixing the outer steel pipe protecting body to the electric tracing band joints, hierarchical and distributed management for the oil and gas transportation pipeline can be conducted in unblocked, easily blocked and blocked positions of the oil and gas transportation pipeline, thereby solving the problem of continuous heating for the oil and gas transportation pipeline in existing projects, reducing the management cost of the oil and gas transportation pipeline and also improving management efficiency.

In the figures: 1 wind power electricity supply device; 2 solar energy electricity supply device; 3 $CO_2$ energy storage device; 4 control device; 5 early warning device; 6 remote operation device; 7 junction box; 8 wire; 9 insulating anticorrosive layer; 10 electric tracing bands; 11 stainless steel cable tie; 12 inner steel pipe body; 13 sandwich layer; 14 protecting pipe; 15 temperature sensor; 16 pressure sensor; 17 valve structure; 18 through groove; 19 outer steel pipe protecting body; 20 flange; 21 pipe clamp; 22 connecting bolt; 23 connecting nut.

DETAILED DESCRIPTION

Specific embodiments of the present invention are further described below in combination with the drawings and the technical solution.

Figure 1:
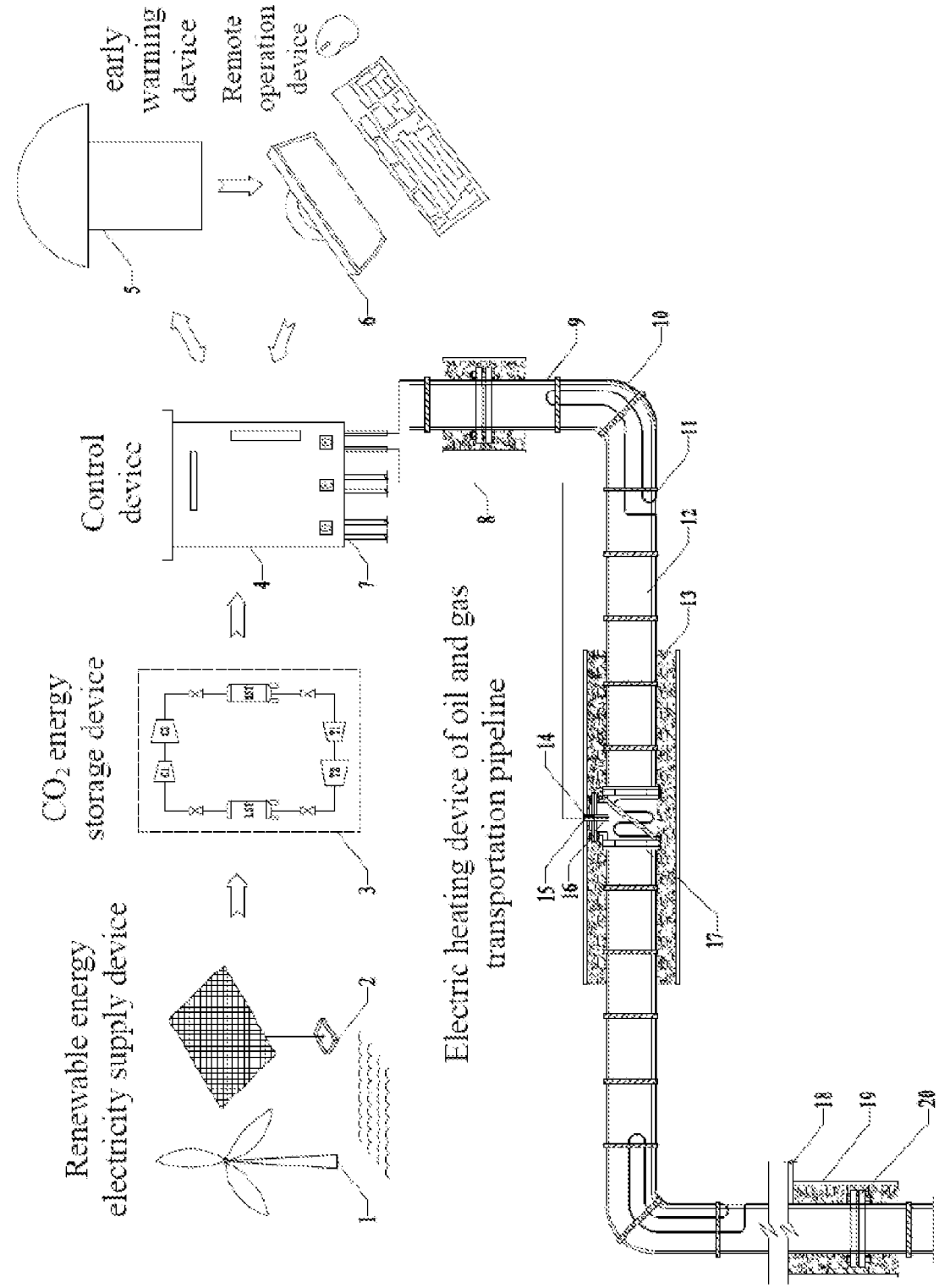
FIG. 1 is a structural schematic diagram of an electric heating thermal management system for an oil and gas transportation pipeline based on renewable energy and $CO_2$ energy storage in embodiments of the present invention.
Figure 2:
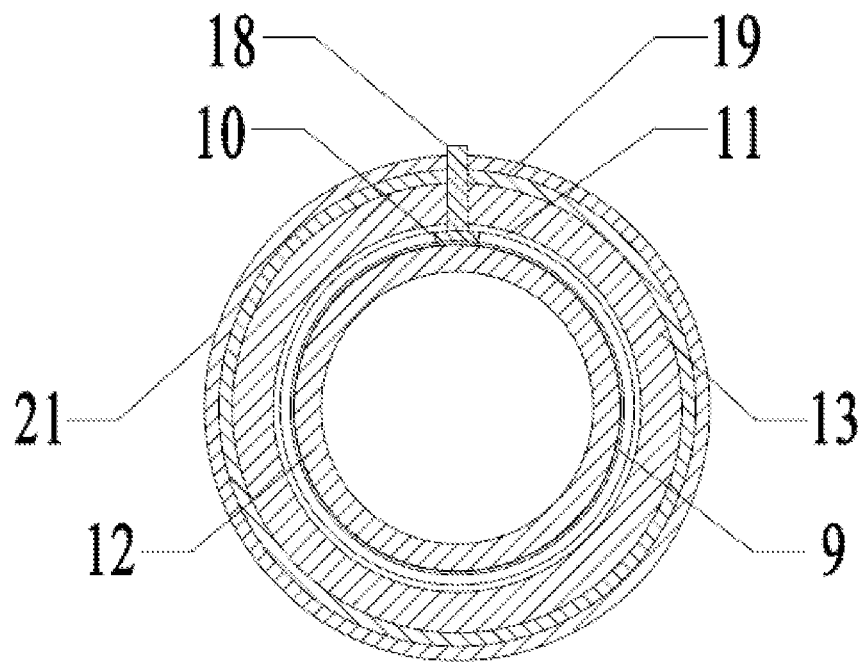
FIG. 2 is a cross-sectional view of an electric heating device of an oil and gas transportation pipeline in embodiments of the present invention.
Figure 3:
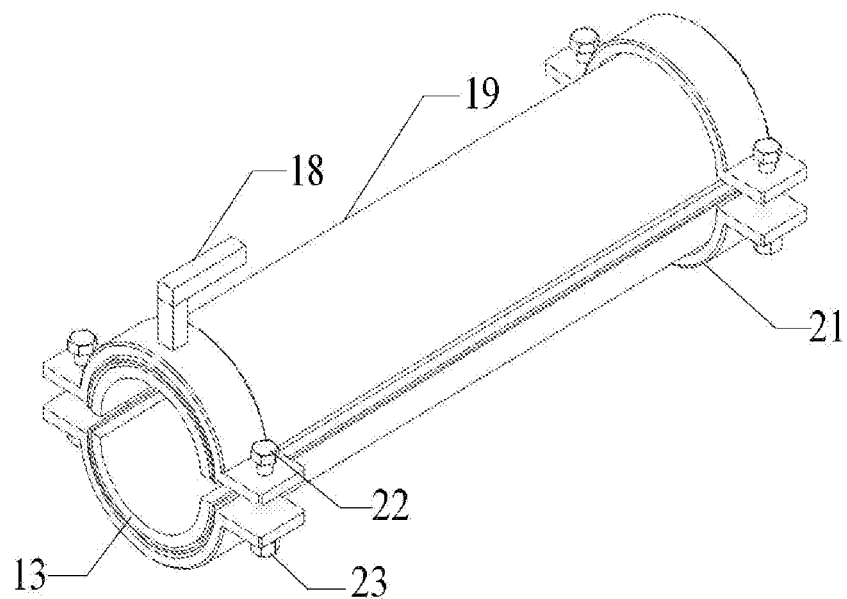
FIG. 3 is a local structural three-dimensional schematic diagram of an electric heating device of an oil and gas transportation pipeline in embodiments of the present invention.

As shown in FIGS. 1-3, the present embodiment discloses an electric heating thermal management system for an oil and gas transportation pipeline based on renewable energy and $CO_2$ energy storage, comprising a renewable energy electricity supply device, a $CO_2$ energy storage device 3, a control device 4, an early warning device 5, a remote operation device 6, and an electric heating device of an oil and gas transportation pipeline.

The energy source of the renewable energy electricity supply device comprises, but not limited to, offshore solar energy, wind energy or ocean current energy, and comprises a wind power electricity supply device 1 and a solar energy electricity supply device 2 in the present embodiment.

The $CO_2$ energy storage device 3 is coupled with the renewable energy electricity supply device; the $CO_2$ energy storage device 3 processes and then transmits the stored electric energy to the control device 4; the control device 4 distributes the electric energy to the electric heating device of the oil and gas transportation pipeline after unified coordination, which can provide steady and continuous power output for the electric heating device and avoid the fluctuation and intermittency of the renewable energy electricity supply device; at the same time, the $CO_2$ energy storage device 3 can also provide $CO_2$ gas; and $CO_2$ is transported through the pipeline in a supercritical state and injected into a seabed storage body, so as to achieve safe and efficient exploitation of reservoir oil and gas and long-term stable geological storage of $CO_2$. However, in a deep-sea environment, the decrease of the temperature in a $CO_2$ gas transportation pipeline will lead to the change of $CO_2$ gas state, which will affect the transportation, storage amount and storage efficiency of $CO_2$ in the storage body. When moisture exists in the $CO_2$ gas transportation pipeline, due to the conditions of low temperature and high pressure on the seabed, solid matters such as hydrates are easy to form in the transportation pipeline and block the pipeline. The electric heating device of the oil and gas transportation pipeline provided by the present invention is also suitable for this case.

The control device 4 dynamically schedules the electric energy provided by the $CO_2$ energy storage device 2; relying on a plurality of groups of junction boxes 7 arranged on the device, a plurality of groups of wires 8 are arranged in the plurality of groups of junction boxes 7; the plurality of groups of wires 8 are wrapped by insulators; and the wires 8 are used for providing electric energy for the electric heating device of the oil and gas transportation pipeline and controlling the electric tracing bands at different positions to produce different thermal responses.

The early warning device 5 is connected with the control device 4 and the remote operation device 6 respectively and used for analyzing and processing signals transmitted by the control device 4 and making a response in time, wherein the early warning device 5 has an intelligent mode and anartificial mode. The intelligent mode: when data values fed back by the temperature sensor 15 and the pressure sensor 16 reach a preset temperature threshold and a preset pressure threshold, an intelligent command control device 4 energizes the electric tracing bands 10 so that oil and gas temperature in the oil and gas transportation pipeline is always kept above the critical temperature for formation of the solid matters such as wax crystals and hydrates. The artificial mode: the early warning device transmits a signal to the remote operation device 6; and a field operator instructs the control device to set different parameters to energize the electric tracing bands 10 at different positions, strictly controls the heating temperature, and can combine with an inhibitor to jointly act according to current heating temperature to ensure the safe and effective operation of the transportation pipeline at low cost.

The electric heating device of the oil and gas transportation pipeline is used for preventing and controlling solid matters in the oil and gas transportation pipeline to ensure the safe and effective operation of the transportation pipeline. The electric heating device of the oil and gas transportation pipeline is provided with an inner steel pipe body 12, an insulating anticorrosive layer 9, the electric tracing bands 10, a sandwich layer 13, an outer steel pipe protecting body 19 and a pipe clamp 21 from inside to outside.

The insulating anticorrosive layer 9 can be selected from insulating anticorrosive paint or insulating anticorrosive film coated or wrapped on the outer wall of the inner steel pipe body 12, which is not only conducive to the mitigation of pipeline corrosion, but also can extend the service life of the electric tracing bands 10. Thermal insulation material is filled in the sandwich layer 13; and the thermal insulation material comprises, but not limited to, epoxy resin and composite polypropylene to reduce heat dissipation time and heat dissipation amount of the oil and gas transportation pipeline.

The electric tracing bands 10 are arranged as heating elements and installed at the outer side of the insulating anticorrosive layer; and in combination with the arrangement modes of direct laying along the axial direction of the pipeline at a straight pipe section and S-shaped arrangement at the elbow section or valve connection, not only the influence of poor heating effect caused by large resistance difference in different positions of the heating elements is reduced, but also the heating amount of the oil and gas transportation pipeline in the easily blocked position is enough, thereby effectively preventing the formation of the solid matters. In addition, stainless steel cable ties 11 as fasteners are used for fastening the electric tracing bands 10 onto the inner steel pipe body 12 in a form of spaced arrangement; the oil and gas pipeline is connected and docked with a valve structure 17 through a flange 20; the flange 20 is fastened by a plurality of connecting bolts 22 and connecting nuts 23; and through holes through which the electric tracing bands 10 penetrate are reserved on the flange 20 to realize secondary fastening for the electric tracing bands.

The oil and gas transportation pipeline adopts a thermal insulation structure of a pipe sleeve pipe sandwich, which not only can satisfy the requirements of pressure resistance and heat preservation of submarine pipelines, but also can arrange the electric tracing bands 10 in the sandwich layer 13, with convenience in arrangement. When the required number of the electric tracing bands 10 is greater than one, the electric tracing bands 10 are uniformly arranged on the axial center of the inner steel pipe body 12. The original structure of the oil and gas transportation pipeline is not damaged. Compared with the unblocking mode of heating with a heating layer arranged on the inner wall of the pipeline, the limitation of material development on the heating elements at the inner wall of the pipeline is avoided. This structure has higher engineering applicability.

The temperature sensor 15 and the pressure sensor 16 extend through the top of the three-way valve to the inner top end of the inner steel pipe body 12, and a protecting pipe 14 is arranged on the outer side, which can ensure full contact with the oil and gas inside the pipeline, and can also ensure the service life of a data collecting device. Compared with laying of a temperature sensing device on the outer wall of the oil and gas pipeline, the monitored data is more accurate, which is conducive to the correct judgment of the early warning device. The protecting pipe 14, the temperature sensor 15 and the pressure sensor 16 are embedded in the valve structure in advance in an actual construction process, and are connected into a whole through a sealing technology to reduce the construction difficulty.

The pipe clamps 21 arranged on the outer steel pipe protecting body 19 at intervals comprise two semicircular upper pipe clamp and lower pipe clamp; and the upper pipe clamp and the lower pipe clamp are connected through a plurality of bolts and nuts. A through groove 18 arranged below the pipe clamp 21 penetrates through the through holes reserved on the sandwich layer 13 and the outer steel pipe protecting body 19 as required, and to the electric tracing band joints, wherein the wires of the temperature sensor 15, the pressure sensor 16 and the electric tracing bands 10 are arranged in the through groove 18 to effectively protect the service life of the wires and make management more convenient. Through this structure, a plurality of groups of wires arranged on the control device can be connected with the electric tracing band joints in different positions; hierarchical and distributed management for the oil and gas transportation pipeline can be conducted in unblocked, easily blocked and blocked positions of the oil and gas transportation pipeline, thereby solving the problem of the influence on a heating effect caused by continuous heating for the oil and gas transportation pipeline and excessive heating length of the electric tracing bands in existing projects, reducing the management cost of the oil and gas transportation pipeline and also improving management efficiency.

The above electric heating thermal management system for the oil and gas transportation pipeline based on renewable energy and $CO_2$ energy storage comprises the work steps:

Step 1, when there is wind energy at sea, wind power is used to drive windmill blades to rotate, and then the speed of rotation is increased by a speed increaser to promote a generator to generate electricity; when there is solar radiation at sea, a photovoltaic effect is used to convert solar radiation energy into electric energy; and electric energy generated by the offshore wind power electricity supply device 1 and the offshore solar energy electricity supply device 2 is transported to the $CO_2$ energy storage device 3 for storage;

Step 2, the $CO_2$ energy storage device 3 processes and then transmits the stored electric energy to the control device 4; and the control device 4 distributes the electric energy to the electric heating device of the oil and gas transportation pipeline after unified coordination;

Step 3, the temperature sensor 15 and the pressure sensor 16 arranged on the valve structure 17 feed back the monitoring data in the pipeline to the control device 4 in real time;

Step 4, the control device 4 receives the feedback data in real time, and synchronously outputs the data to the early warning device 5;

Step 5, the early warning device 5 presets the temperature threshold and the pressure threshold for solid matter generation in oil and gas transportation pipeline; when the feedback data value reaches the preset value, the early warning device 5 sends out a control signal intelligently, and commands the control device 4 to energize the electric heating device of the oil and gas transportation pipeline so that oil and gas temperature in the oil and gas transportation pipeline is always kept above the critical temperature for solid matter formation; meanwhile, the early warning device 5 synchronizes the feedback data to the remote operation device 6; and a field operator instructs the control device 4 to set different parameters to energize the electric tracing bands 10 at different positions according to the fluctuation of the feedback value around the range of the temperature threshold and the pressure threshold, strictly controls the heating temperature, and avoids the loss of the electric energy caused by excessive heating. If the parameters in the pipeline are close to the generation condition of solid matters or a few solid matters are generated in the pipeline but do not affect the oil and gas transportation at this moment, the field operator can increase the heating temperature slightly and combine with an inhibitor to jointly act to ensure the safe and effective operation of the transportation pipeline on the premise of low cost. On the contrary, if the parameters in the pipeline obviously exceed the generation condition of solid matters or more solid matters can be judged to be generated at this moment, the field operator should increase the heating amount, and can stop the oil and gas transportation in serious cases, to avoid causing huge economic losses.

The invention claimed is:

1. An electric heating thermal management system for an oil and gas transportation pipeline based on renewable energy and $CO_2$ energy storage, comprising:

a renewable energy electricity supply device used for low-cost electric energy supply;

a $CO_2$ energy storage device connected with the renewable energy electricity supply device and used for storing electric energy, steadily and continuously outputting electricity and providing replacement gas for efficient exploitation of reservoir oil and gas;

a control device connected with the $CO_2$ energy storage device and used for providing electric energy for an electric heating device of the oil and gas transportation pipeline using the electric energy provided by the $CO_2$ energy storage device, and controlling electric tracing bands to produce different thermal responses;

an early warning device connected with the control device and a remote operation device respectively and used for analyzing and processing signals transmitted by the control device and making a response in time;

the remote operation device connected with the early warning device and the control device respectively and used for commanding the control device for controlling an operation state of the electric heating device of the oil and gas transportation pipeline;

the electric heating device of the oil and gas transportation pipeline, which is connected with the control device and used for preventing and controlling solid matters in the oil and gas transportation pipeline to ensure the safe and effective operation of the transportation pipeline.

2. The electric heating thermal management system for the oil and gas transportation pipeline based on renewable energy and $CO_2$ energy storage according to claim 1, wherein the control device is provided with a plurality of groups of junction boxes; and a plurality of groups of wires are arranged in the junction boxes.

3. The electric heating thermal management system for the oil and gas transportation pipeline based on renewable energy and $CO_2$ energy storage according to claim 1, wherein the electric heating device of the oil and gas transportation pipeline is provided with an inner steel pipe body, an insulating anticorrosive layer, the electric tracing bands, a sandwich layer, an outer steel pipe protecting body and a pipe clamp from inside to outside.

4. The electric heating thermal management system for the oil and gas transportation pipeline based on renewable energy and $CO_2$ energy storage according to claim 3, wherein thermal insulation material is filled in the sandwich layer; and the thermal insulation material comprises, but not limited to, epoxy resin and composite polypropylene.

5. The electric heating thermal management system for the oil and gas transportation pipeline based on renewable energy and $CO_2$ energy storage according to claim 3, wherein the electric tracing bands are axially laid in a distributed way in a straight pipe section along the outer side of the inner steel pipe body, and are arranged in an S shape at an elbow section of the pipeline or a three-way valve.

6. The electric heating thermal management system for the oil and gas transportation pipeline based on renewable energy and $CO_2$ energy storage according to claim 3, wherein when the electric tracing bands are laid on the outer side of the inner steel pipe body in a form of one for use and one for backup or more than two, the electric tracing bands are uniformly arranged on the axial center of the inner steel pipe body.

7. The electric heating thermal management system for the oil and gas transportation pipeline based on renewable energy and $CO_2$ energy storage according to claim 3, wherein the electric tracing bands are fixed on the outer wall of the inner steel pipe body through stainless steel cable ties or metal soft wires arranged at intervals and flanges with reserved through holes.

8. The electric heating thermal management system for the oil and gas transportation pipeline based on renewable energy and $CO_2$ energy storage according to claim 1, wherein the electric heating device of the oil and gas transportation pipeline is provided with a pipe clamp for fixing the pipeline in a distributed way; the pipe clamp comprises two semicircular upper pipe clamp and lower pipe clamp; and two ends of the upper pipe clamp and the lower pipe clamp are connected through a plurality of bolts and nuts.

9. The electric heating thermal management system for the oil and gas transportation pipeline based on renewable energy and $CO_2$ energy storage according to claim 3, wherein through holes are reserved on the sandwich layer and the outer steel pipe protecting body as required; a through groove perpendicular to the inner steel pipe body is arranged on the upper part or the lower part of the pipe clamp as required; and a plurality of groups of wires arranged below the control device are connected with electric tracing band joints through the through groove, which will realize the distributed management of the oil and gas transportation pipeline.

10. The electric heating thermal management system for the oil and gas transportation pipeline based on renewable energy and $CO_2$ energy storage according to claim 1, wherein the early warning device has an intelligent mode and an artificial mode; the intelligent mode: when data values fed back by a temperature sensor and a pressure sensor reach a preset temperature threshold and a preset pressure threshold, an intelligent command control device energizes the electric tracing bands so that oil and gas temperature in the oil and gas transportation pipeline is always kept above the critical temperature for formation of the solid matters; the artificial mode: the early warning device transmits a signal to the remote operation device; and a field operator instructs the control device to set different parameters to energize the electric tracing bands at different positions, controls the heating temperature, and combines with an inhibitor to jointly act when necessary to ensure the safe and effective operation of the transportation pipeline on the premise of low cost.

* * * * *